United States Patent [19]

Rutenberg et al.

[11] 4,048,435

[45] Sept. 13, 1977

[54] METHOD FOR THE PREPARATION OF HIGHLY SUBSTITUTED GRANULAR STARCHES

[75] Inventors: Morton W. Rutenberg, North Plainfield; Wadym Jarowenko, Plainfield; Martin M. Tessler, Edison, all of N.J.

[73] Assignee: National Starch and Chemical Corporation, Bridgewater, N.J.

[21] Appl. No.: 704,472

[22] Filed: July 12, 1976

[51] Int. Cl.$^2$ ............... C08B 31/02; C08B 31/08
[52] U.S. Cl. .................................. 536/106; 536/104; 536/107; 536/108; 536/110; 536/111
[58] Field of Search ............... 536/104, 107, 108, 111, 536/106, 110

[56] References Cited

U.S. PATENT DOCUMENTS

| | | | |
|---|---|---|---|
| 2,992,215 | 7/1961 | Bullock et al. | 210/37 R |
| 3,218,314 | 11/1965 | Miller | 536/111 |
| 3,438,913 | 4/1969 | Hjermstad | 536/111 |
| 3,904,601 | 9/1975 | Tessler | 536/104 |

*Primary Examiner*—Melvyn I. Marquis
*Attorney, Agent, or Firm*—Edwin Szala; Ellen T. Dec

[57] ABSTRACT

Highly substituted granular starches are prepared by reacting the starch in an aqueous system with a reagent capable of producing an acetal cross-linkage; reacting the resultant acetal cross-linked starch with a monofunctional esterifying or etherifying reagent under aqueous alkaline conditions and removing the acetal cross-linkages by treating under acid conditions. The highly substituted starches are particularly useful in operations, such as papermaking, wherein the cross-linkages can be removed and the starch readily dispersed during a relatively low pH starch cooking process.

9 Claims, No Drawings

METHOD FOR THE PREPARATION OF HIGHLY SUBSTITUTED GRANULAR STARCHES

The present invention is directed to a method for the production of highly substituted starches in granular form.

Starches which have been reacted under a variety of reaction conditions with both cross-linking agents and with etherifying or esterifying agents are known in the literature and may be considered as represented by U.S. Pat. Nos. 3,014,901; 3,438,913, 2,853,484 and 2,992,215. Of these references, only U.S. Pat. No. 3,438,913 to Hjermstad teaches the use of these starches in the production of highly substituted granular starches.

Applicants have provided a method for preparing highly substituted granular starches using cross-linked and etherified or esterified starches other than those employed by the Hjermstad process. Moreover, applicants have provided a method for producing a highly substituted granular starch which can be readily dispersed and gelatinized when desired by treatment in an acid environment wherein the cross-linkages are removed and a substantially noncross-linked, high D.S. dispersed starch is produced. These starches are useful in a variety of applications such as in textiles, adhesives and paper. The starches are particularly useful when employed in operations such as in papermaking, wherein the cross-linkages will be removed and the starch will readily disperse during the relatively low pH starch cooking process conventionally employed therein.

In accordance with the present invention, highly substituted granular starch products are produced by reacting the starch in an aqueous system with a reagent capable of producing an acetal cross-linked starch, the resultant acetal cross-linked granular starch being so toughened that it will not swell appreciably in neutral or alkaline media. This cross-linked starch may then be reacted with the desired mono-functional esterifying or etherifying reagents under the required aqueous alkaline conditions to produce the highly substituted starch product. The acetal cross-linkages may then be readily removed by treating under acidic conditions.

The applicable starch base materials which may be treated in accordance with the present invention may be any granular starch derived from any plant source including corn, potato, sweet potato, wheat, rice, sago, tapioca, waxy maize, sorghum, high amylose corn, or the like. Also included are the conversion products that are not dispersible under conditions of acetal cross-linking reactions and which are derived from any of the latter bases including, for example, oxidized starches prepared by treatment with oxidants such as sodium hypochlorite; derivatized starches such as starch ethers and esters, and fluidity or thin boiling starches prepared by enzyme conversion or by mild acid hydrolysis. The use of the term "starch base" is thus seen to include any granular, amylaceous substance, whether untreated or chemically modified which, however, still retains free hydroxyl groups capable of entering into the reaction of the invention.

The reagents employed in the first stage of the process are any reagents capable of producing an acetal cross-linked starch. Suitable reagents include aliphatic monoaldehydes containing 2 – 5 carbon atoms and aliphatic dialdehydes containing 3 – 5 carbon atoms such as acetaldehyde, valeraldehyde, glutaric dialdehyde, etc., as well as other acetal producing reagents including the alkyl propiolates of the formula $HC \equiv CCOOR$ wherein R is an alkyl group having form 1 to 8 carbon atoms, preferably 1 to 6 carbon atoms. The latter class of acetal producing cross-linking reagents is exemplified by methyl propiolate, ethyl propiolate, isopropylpropiolate, n-propylpropiolate, n-butylpropiolate, n-amylpropiolate, n-hexylpropiolate, etc.

The reaction between the starch and the acetal cross-linking reagent may be carried out under a wide variety of conditions depending upon the particular reagent employed. As an example, if an aldehyde is used as cross-linking reagent, the reaction is carried out in aqueous medium at a pH of 2.5 or lower, preferably below 2.0. In contrast, if cross-linking is effected using a propiolate, the reaction is carried out under aqueous conditions at a pH of 6.5 to 12.5, preferably about 8.5 to 12.5.

The cross-linking reaction is usually carried out at temperatures in the range of 10° to 55° C., preferably between 20 and 40° C. It will be recognized that temperatures above about 55° C., would be undesirable for this process since it may result in granule swelling and filtration difficulties or gelatinization of the starch.

The amount of cross-linking reagent employed will vary from 0.5 to 15%, based on the dry weight of the starch, with the preferred amount depending upon such factors as the starch base employed, the degree of cross-linking required in the end product and the particular cross-linking reagent employed. It will be recognized that the amount of cross-linking reagent required will depend on the degree of subsequent etherification or esterification desired since the higher degree of substitution will require a greater number of acetal cross-linkages in order to prevent swelling during the etherification or esterification reaction.

Reaction time will vary from about 0.2 to 24 hours preferably from 8 to 16 hours for aldehydes and 0.5 to 1.5 hours for propiolates, depending upon such factors as the reactivity of the reagent used, the amount of reagent used, the temperature of the reaction, etc. Completion of the reaction may be determined by performing a sediment volume test. In this procedure, an aqueous suspension at pH 7.0 of the cross-linked product having a concentration of 1% solids, by weight, is cooked on a boiling water bath for about 15 minutes. The resulting dispersion is then allowed to stand in a graduated vessel such as a 100 ml. graduated cylinder, at room temperature for a period of about 16 hours. The cooked product will separate into layers on the basis of relative inhibition. The sediment volume will decrease with increasing amounts of cross-linking but will become constant when the reaction is completed.

In the embodiment wherein an aldehyde is employed to effect the acetal cross-linkage, it is necessary after the cross-linking reaction is complete to raise the pH to within the range of 5.0 to 8.0, preferably about 6.5, a range wherein the acetal cross-linked starch will be stable. The pH is conveniently raised with dilute aqueous solutions of sodium hydroxide, potassium hydroxide or the like. After adjusting the pH, it is then usually necessary to wash the starch free of any unreacted aldehyde reagent since the presence of substantial quantities of the aldehyde in the second stage reaction may cause formation of colored aldehyde condensation products. The resulting washed acetal cross-linked product may be dried or used directly in slurry form in the second stage reaction. It is to be noted however that washing between reactions is not normally required when the second stage reaction is carried out at relatively low pH, e.g. pH 8.0 acetylation reactions.

When other cross-linking reagents such as the propiolates are employed which require reaction at alkaline pH ranges, the resulting acetal cross-linked starch may be used directly in its slurry form without washing in the second stage reaction with the pH of the starch slurry being lowered or raised if necessary, to the required degree of alkalinity. If desired, the starch can be washed to remove residual propiolate before the second stage reaction.

The reagent used in the second stage of the reaction may be any of the well known monofunctional etherifying or esterifying reagents known to react with starch under aqueous alkaline conditions. Among such reagents are included: epoxide etherifying agents such as the monoepoxy alkanes or the monoepoxy alkanes containing other functional groups which are not reactive with the starch, e.g. ethylene oxide, propylene oxide, butylene oxide, 1,2-epoxybutene, styrene oxide, reactive monohalogen substituted alkenes or reactive monohalogen substituted alkanes containing other functional groups which are not reactive with the starch under the conditions employed, e.g. allyl chloride or bromide, benzyl chloride or bromide, sodium monochloroacetate, sodium monochloropropionate, dialkylaminoethyl chloride; monohalohydrins and other monohalogen substituted reagents; activated unsaturated compounds capable of reacting with the hydroxyl groups of starch, e.g. acrylonitrile, acrylamide or acrylate esters; and organic anhydrides, e.g. acetic anhydride, etc., as well as such reagents which will result in the production of inorganic monostarch phosphate and mono-starch sulfate derivatives.

It will be recognized that the amount of esterification or etherification achieved by the method of the present invention will vary depending upon the nature of the specific reagents employed. Thus, in the case of reagents such as acetic anhydride it is relatively easy to achieve a D.S. of up to about 0.16 in water using conventional techniques and hence the method of the present invention would not be employed unless higher D.S. values were desired. In contrast, reagents such as diethylaminoethyl chloride can be reacted with starch in water only up to D.S. levels of about 0.05 before the starch product becomes too swollen to be purified by washing with water and the method presented herein would thus be useful whenever levels above this range were desired. Attempts to prepare high D.S. products in water without prior cross-linking of the starch will result in very swollen or gelatinized starches which cannot be isolated and purified by filtration and washing with water.

It will also be recognized that the reaction conditions, degree of alkalinity, etc. will vary depending upon the specific reagents employed in this second step. Illustrative patents covering a number of these reactions include U.S. Pat. Nos. 2,461,139; 3,022,289; 3,720,662; 2,975,124; 2,516,632; 2,516,633; 2,516,634; 3,033,852; 2,876,217; 3,378,547; 3,624,070; 2,523,709; 2,773,067; 3,062,810; 3,838,149 among others, the disclosures of which are incorporated herein by reference. Other patents directed to methods for esterifying or etherifying starches in aqueous alkaline environments are well known to those skilled in the art and are equally suitable for use in the present invention.

In general, the etherification or esterification reactions will be carried out at temperatures of 10° to 55° C., preferably 20° to 40° C. for a period of 1 to 24 hours. As was previously explained, the degree of substitution desired and hence amount of reagent used will vary over a wide range but will generally range from about 10 to 60% reagent, by weight.

The maximum amount of substitution obtainable by the process of the invention wherein the starch product can be handled and processed in granule form in water will depend on the level of cross-linking, the starch base and the particular etherification or esterification reagent. As an example, corn starch which has been treated with 10% acetaldehyde will give filterable products after reaction with propylene oxide, sodium chloroacetate or dimethylaminoethyl chloride only if the D.S. is less than about 0.76, 0.16 or 0.18 respectively. Generally when ionic substituents are employed, the maximum D.S. obtainable will be lower than that obtainable using neutral substituents.

After completion of the monofunctional etherification or esterification reaction, the resulting highly substituted starch is recovered by lowering the pH to about 5.0 to 7.0, filtering, washing and drying.

As a third step in the invention, it is necessary to remove the acetal cross-linkages. These linkages may be removed by treating the starch under specified acidic conditions. The most convenient method comprises cooking the starch in an aqueous acidic environment, at a pH of less than 3.5, preferably within a range of 2.5 to 3.5. The rate of removal of the acetal crosslinkages will be dependent upon the temperature and the pH. Thus, increasing the temperature and/or decreasing the pH will increase the rate of acetal hydrolysis. Alternatively, the acetal crosslinkage may be removed by treatment in an acidic organic medium such as in an acidic alcohol solution.

The highly inhibited granular starches of the present invention may be used in a variety of applications in the adhesive, textile and paper industries. Due to the unique behavior of the starches at low pH, these materials are of particular interest in the paper manufacturing process. In these cases, the starch cooking operation is frequently carried out at low pH ranges so that the acetal linkage will be readily removed and the final product will benefit fully from the highly substitited starch present therein.

It is to be noted that a large number of variations may be effected in reacting the starch base with the reagents in accordance with the invention without departing from the spirit and scope thereof. Such variations will be evident to those skilled in the art.

The following examples illustrate some embodiments of the invention. In these examples, all parts given are by weight unless otherwise noted.

EXAMPLE I

This example illustrates the preparation of the starches designated A, B, C and D, 1000 parts of the base starches were slurried in water and the pH lowered to 2.0 with 9.2% aqueous hydrochloric acid. The appropriate amounts of acetal cross-linking reagent were added and the resulting mixture agitated in a sealed vessel at 40° C. for 16 hours. The reaction mixtures were then cooled to about 25° C. the pH raised to 6.5 with 3% sodium hydroxide and the starches recovered by filtration, washed three times with water and dried. The particular starches, reagents and amounts are shown in Table I.

TABLE I

| Sample | Starch | Amount Water | Reagent | % Based on Starch Solids |
|---|---|---|---|---|
| A | corn | 1250 | acetaldehyde | 10% |
| B | potato | 1500 | acetaldehyde | 10% |
| C | waxy maize acid converted to 85 fluidity | 1500 | glutaric dialdehyde | 1.75% |
| D | corn | 1250 | valeraldehyde | 10% |

(Part B) The resultant acetal cross-linked starches were then reacted with monofunctional reagents as described below.

Preparation of Samples E and F: A total of 100 parts of the acetal cross-linked starch was added to 180 parts water. To the resulting slurry was added 24 parts and 16 parts respectively of calcium hydroxide and 60 and 40 parts respectively of a 50% aqueous solution of diethylaminoethylchloride hydrochloride. The mixtures were agitated in a sealed jar at 40° C. for 16 hours, the pH lowered to 6.0 with 9.2% aqueous hydrochloric acid and the starches recovered by filtration, washed three times with water and dried. The degree of substitution of the resultant starches are shown in Table II.

Preparation of Sample G: A total of 100 parts of the acetal cross-linked starch was added to a solution of 30 parts sodium sulfate and 3.75 parts sodium hydroxide in 125 parts water. The temperature of the slurry was raised to 50° C. and 50 parts sodium chloroacetate added over 20 minutes. The temperature was maintained at 50° C. and the pH controlled at 11.8-12.0 by adding 3% aqueous sodium hydroxide as required. After 6.5 hours, the pH was lowered to 6.0 with 10% aqueous hydrochloric acid and the starch recovered by filtration, washed three times with water and dried.

Samples H, J and K: A total of 50 parts of each of the particular acetal crosslinked starches was added to 62.5 parts water and the pH raised to 8.0 with 3% aqueous sodium hydroxide. The predetermined amount of acetic anhydride was added dropwise over three hours while controlling the pH at 8.0 with 3% aqueous sodium hydroxide as required. The reaction was carried out at room temperature (about 23° C.) with good agitation. After the addition of the acetic anhydride was completed and the pH became constant, the pH was lowered to 6.5 with 9.5% aqueous hydrochloric acid and the starch product recovered by filtration, washed three times with water and dried.

The reagents, amounts and degrees of substitution of the resultant starches are shown in Table II.

TABLE II

| Sample | Starch Base | Amount Water | Reagent | % Based on Starch | D.S. |
|---|---|---|---|---|---|
| E | A | 180 | diethylaminoethyl-chloride hydrochloride | 30% | 0.18 |
| F | A | 180 | diethylaminoethyl-chloride hydrochloride | 20% | 0.12 |
| G | A | 125 | sodium chloroacetate | 50% | 0.16 |
| H | B | 125 | acetic anhydride | 30% | 0.26 |
| J | C | 150 | acetic anyhdride | 30% | 0.31 |
| K | D | 125 | acetic anhydride | 20% | 0.21 |

The inhibited, stabilized starch products were characterized by the following settling test:

A total of 1.00 grams starch, dry basis, was placed in a beaker and 95.0 ml. distilled water added. The pH was adjusted to 7.0 with 1% aqueous sodium hydroxide. If necessary, 0.1N hydrochloric acid was used to lower the pH during pH adjustment. The starch slurry was cooked in a boiling water bath for 15 minutes and distilled water was then added to bring the total weight to 100.0 g. The mixture was stirred thoroughly and transferred to a 100 ml. graduated cylinder. The cylinder was sealed with aluminum foil and the starch slurry was kept at room temperature for 24 hours. The sediment, which is swollen starch granules, was then measured. The results are summarized in Table III.

TABLE III

| Starch | Sediment Volume (ml) |
|---|---|
| A | 5.0 |
| B | 5.0 |
| C | 7.5 |
| D | not measured |
| E | 12.5 |
| F | 11.5 |
| G | 16.5 |
| H | 6.0 |
| J | 24.0 |
| K | 12.0 |

EXAMPLE II

This example illustrates the preparation of highly substituted starches using the process of the present invention with various levels of reagent treatment.

In preparing the starches described in Table IV the procedures employed in Part A of Example I were followed using 100 parts corn starch and 125 parts water. Due to the nature of the two monofunctional reagents employed, the procedures employed in Part B varied. When propylene oxide was used as reagent, 50 parts of each of the acetal cross-linked starches were added to a solution of 0.75 parts sodium hydroxide and 15 parts sodium sulfate in 65 parts water. After addition of the propylene oxide, the mixtures were agitated in a sealed jar at 40° C. for 16 hours. The pH was lowered to 5.0 with dilute hydrochloric acid, the starches recovered by filtration, washed three times with water and dried.

TABLE IV

| | Reagent (a) | % by Wt. on Starch | Sediment Volume | Reagent (b) | % by Wt. on Starch | D.S. | Sediment volume |
|---|---|---|---|---|---|---|---|
| L | acetaldehyde | 2.5 | * | propylene oxide | 20% | 0.43 | 10.0 ml. |
| M | acetaldehyde | 5.0 | * | propylene oxide | 20% | 0.45 | 8.0 m |
| N | acetaldehyde | 10.0 | 7.0 ml. | propylene oxide | 30% | 0.76 | 6.5 ml |
| O | acetaldehyde | 1% | 10.0 ml | acetic anhydride | 30% | 0.29 | 12.5 ml |
| P | acetaldehyde | 2% | 8.5 ml | acetic anhydride | 30% | 0.30 | 10.0 ml |
| Q | acetaldehyde | 4% | 8.0 ml. | acetic anydride | 50% | 0.39 | 9.0 ml. |

*not measured

In the samples wherein acetic anhydride was employed, 50 parts of each of the acetal cross-linked starches were suspended in 62.5 parts water and the pH raised to 8.0 with 3% aqueous sodium hydroxide. The acetic anhydride was then added slowly over 180 minutes at room temperature with agitation while controlling the pH at 8.0 by adding 3% aqueous sodium hydroxide as required. The pH was lowered to 6.5 with 9.5% aqueous hydrochloric acid, the starches recovered by filtration, washed three times with water and dried.

EXAMPLE III

This example illustrates the preparation of the starches of this invention wherein the starch reaction product with an aldehyde is not washed prior to the subsequent monofunctional starch reaction.

A total of 100 parts corn starch was suspended in 125 parts water and the pH lowered to 2.0 with 10% aqueous hydrochloric acid. Then 10 parts acetaldehyde was added and the resulting mixture agitated at 40° C. for 16 hours. The starch slurry was cooled to about 23° C., the pH raised to 8.0 with 3% aqueous sodium hydroxide and 30 parts of acetic anhydride slowly added while maintaining the pH at 8.0 by adding 3% aqueous sodium hydroxide as required. At the end of the reaction when the pH was constant, 10% aqueous hydrochloric acid was added to lower the pH to 6.0, the starch recovered by filtration, washed three times with water and dried. Upon analysis, it was found to contain 5.0% acetyl, by weight (D.S. = 0.20). When evaluated by settling volume test, it had a sediment value of 5.0 ml.

EXAMPLE IV

This example illustrates the use of ethyl propiolate in preparing the acetal cross-linkages used in the preparation of the highly substituted starch derivatives using the method of the present invention.

One hundred parts waxy maize starch was suspended in 125 parts water and the pH adjusted to 9.5 with 3% aqueous sodium hydroxide solution. Then 3.2% by weight of the starch of ethyl propiolate were added and the pH controlled at 9.5 by the addition of sodium hydroxide as required. After reacting for 17 hours at ambient conditions, the pH was lowered to 5.0–6.0 with dilute sulfuric acid, the starch isolated by filtration, washed three times with water and dried. The resulting acetal cross-linked starch had a sediment volume of 9 ml.

Then 100 parts of the resulting acetal cross-linked starch was added to a solution of 1.5 parts sodium hydroxide and 30 parts sodium sulfate in 125 parts water. Then 30 parts propylene oxide was added and the mixture agitated in a sealed jar at 40° C. for 16 hours. At the end of the reaction, 150 parts water was added to reduce viscosity, the pH lowered to 6.0 with 9.5% aqueous hydrochloric acid, the starch recovered by filtration, washed three times by resuspending in water and filtering, and dried. Upon analysis, the starch product was found to contain 18.6% propylene oxide by weight.

The stability of the acetal cross-linkage was determined in the following manner. A total of 6.0 parts starch product and 96.0 parts water was cooked at pH 7.0 for 20 minutes in a boiling water bath. The cooked starch was cooled and allowed to stand at room temperature for 24 hours. The starch settled slightly and when stirred was relatively thin. The product was also cooked in the identical manner as described above except the pH was lowered to 3.0. The cooked dispersion was much clearer and heavier than the pH 7.0 cook and no settling occurred. This indicates that the cross-linkage is removed at pH 3.0, but remains intact at pH 7.0.

As will be recognized to those skilled in the art, variations may be made in ingredients, proportions and procedures as long as such variations are within the scope and spirit of the following claims.

We claim:

1. A process for the production of highly substituted granular starch products comprising the steps of:
   a. reacting the starch in an aqueous system with from 0.5 to 15% by dry weight of the starch of a reagent capable of producing an acetal cross-linkage;
   b. reacting said acetal cross-linked starch in an aqueous alkaline system with a mono-functional esterifying or etherifying reagent; and
   c. removing said acetal cross-linkages by treating under acidic conditions.

2. A process of claim 1 wherein the reagent capable of producing the acetal cross-linkage is selected from the group consisting of aliphatic monoaldehydes containing 2 to 5 carbon atoms, aliphatic dialdehydes containing 3 to 5 carbon atoms and the alkyl propiolates wherein the alkyl group contains from 1 to 8 carbon atoms.

3. The process of claim 1 wherein the reagent of step (a) is selected from the group consisting of aliphatic monoaldehydes containing 2 to 5 carbon atoms and aliphatic dialdehydes containing 3 to 5 carbon atoms and the reaction is carried out at a pH of less than 2.5 and at a temperature of 10° to 55° C. for a period of 8 to 16 hours.

4. The process of claim 1 wherein the reagent of step (a) is an alkyl propiolate and the reaction is carried out at a pH of 6.5 to 12.5 and at a temperature of 10° to 55° C. for a period of 0.5 to 1.5 hours.

5. The process of claim 1 wherein the acetal cross-linked starch of step (a) is washed free of unreacted reagent prior to the reaction of step (b).

6. The process of claim 1 wherein the reagent of step (b) is selected from the group consisting of epoxide etherifying agents, reactive monohalogen substituted alkenes or alkanes containing other functional groups which are not reactive with the starch under the conditions employed, activated unsaturated compounds capable of reacting with the hydroxyl groups of starch and organic anhydrides.

7. The process of claim 6 wherein the reagent is selected from the group consisting of ethylene oxide, propylene oxide, butylene oxide, 1,2-epoxybutene, styrene oxide, allyl chloride, allyl bromide, benzyl chloride, benzyl bromide, sodium monochloroacetate, sodium monochloropropionate, dialkylaminoethyl chloride, acrylonitrile, acrylamide, and acetic anhydride.

8. The process of claim 1 wherein the reagent of step (b) is used in an amount of 10 to 60% by dry weight of the starch.

9. The process of claim 1 wherein the acetal crosslinkage is removed in step (c) by cooking in water at a pH of 2.5 to 3.5.

* * * * *